United States Patent [19]
Testa

[11] Patent Number: 5,660,344
[45] Date of Patent: Aug. 26, 1997

[54] FISHING REEL HANDLE

[76] Inventor: Thomas J. Testa, 36 Sunnyfield Dr., Windsor, Conn. 06095

[21] Appl. No.: 234,553

[22] Filed: Apr. 28, 1994

[51] Int. Cl.$^6$ ............................................. A01K 89/00
[52] U.S. Cl. .................................... 242/283; 74/545
[58] Field of Search ................................. 242/283, 284; 74/545, 555, 557, 546

[56] References Cited

U.S. PATENT DOCUMENTS

| | | | |
|---|---|---|---|
| 1,744,413 | 1/1930 | Peterson et al. | 74/545 |
| 1,894,985 | 1/1933 | Flowers | 242/284 |
| 2,251,168 | 7/1941 | Ronnick | 242/283 |
| 2,793,542 | 5/1957 | Hirschkorn | 74/545 |
| 3,375,993 | 4/1968 | Hayes | 74/546 |
| 5,150,853 | 9/1992 | Bernard et al. | 242/283 |
| 5,295,640 | 3/1994 | Kawabe | 242/284 |
| 5,328,128 | 7/1994 | Morris | 242/283 |
| 5,433,394 | 7/1995 | Brozio | 242/283 |

FOREIGN PATENT DOCUMENTS

| | | | |
|---|---|---|---|
| 113752 | 2/1926 | Germany | 74/545 |
| 11065 | of 1894 | United Kingdom | 242/284 |

*Primary Examiner*—Katherine Matecki
*Attorney, Agent, or Firm*—Fishman, Dionne, Cantor & Colburn

[57] ABSTRACT

A fishing reel has a crank assembly for winding the reel with a member or arm connected at one end thereof for rotation with the crank. The other end of the arm has a rotatable shaft affixed thereto with a pivoting handle unit affixed at the other end of the shaft. The handle unit includes a sleeve affixed to the end of the shaft with a handle pivotally mounted to the sleeve. The handle has a center axis passing longitudinally therethrough and the shaft has a center axis passing longitudinally therethrough. The angle between the axes is about 90° in a first end position and about 115° in a second end position. A padded cover is disposed about the handle and is secured thereon by end caps. It will be appreciated that one end of the shaft could extend be pivotally connected to the handle in the same manner the sleeve was connected to the handle, thereby eliminating the sleeve. In a preferred embodiment, the assembly comprising the arm, the shaft and the handle is readily replaceable with the corresponding assembly on a standard reel. In other words neither the reel nor the crank require any modification to employ the assembly of the present invention.

30 Claims, 2 Drawing Sheets

FISHING REEL HANDLE

BACKGROUND OF THE INVENTION

The present invention relates generally to fishing reels. More specifically, the present invention relates to fishing reels having a pivotable handle and to fishing reels having a padded handle.

Fishing reels have a crank assembly for winding the reel with an arm connected at one end thereof for rotation with the crank. The other end of arm has a rotatable shaft affixed thereto with a handle affixed at the other end of the shaft. The handle has a center axis passing longitudinally therethrough and the shaft has a center axis passing longitudinally therethrough, with the axes being generally perpendicular.

It is known that fatigue in the arm muscles of the user can result when reeling in a large fish.

SUMMARY OF THE INVENTION

The above discussed and other drawbacks and deficiencies of the prior art are overcome or alleviated by the handle assembly for a fishing reel of the present invention. In accordance with the present invention, the reel has a crank assembly for winding the reel with a member or arm connected at one end thereof for rotation with the crank. The other end of the arm has a rotatable shark affixed thereto with a pivoting handle unit affixed at the other end of the shaft. The handle unit includes a sleeve affixed to the end of the shaft with a handle pivotally mounted to the sleeve. The handle has a center axis passing longitudinally therethrough and the shaft has a center axis passing longitudinally therethrough. The angle between the axes is about 90° in a first end position and about 115° in a second end position. A padded cover is disposed about the handle and is secured thereon by end caps. The padded cover is preferably comprised of a known type ethyl vinyl acetate padding. It will be appreciated that one end of the shaft could extend be pivotally connected to the handle in the same manner the sleeve was connected to the handle, thereby eliminating the sleeve. In a preferred embodiment, the assembly comprising the arm, the shall and the handle is readily replaceable with the corresponding assembly on a standard reel. In other words neither the reel nor the crank require any modification to employ the assembly of the present invention.

It is believed that the pivotability of the handle significantly reduce fatigue when reeling in a large fish. Further, the addition of padding on the handle greatly adds to the comfort and firmness of the grip on the handle.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

Figure 1:
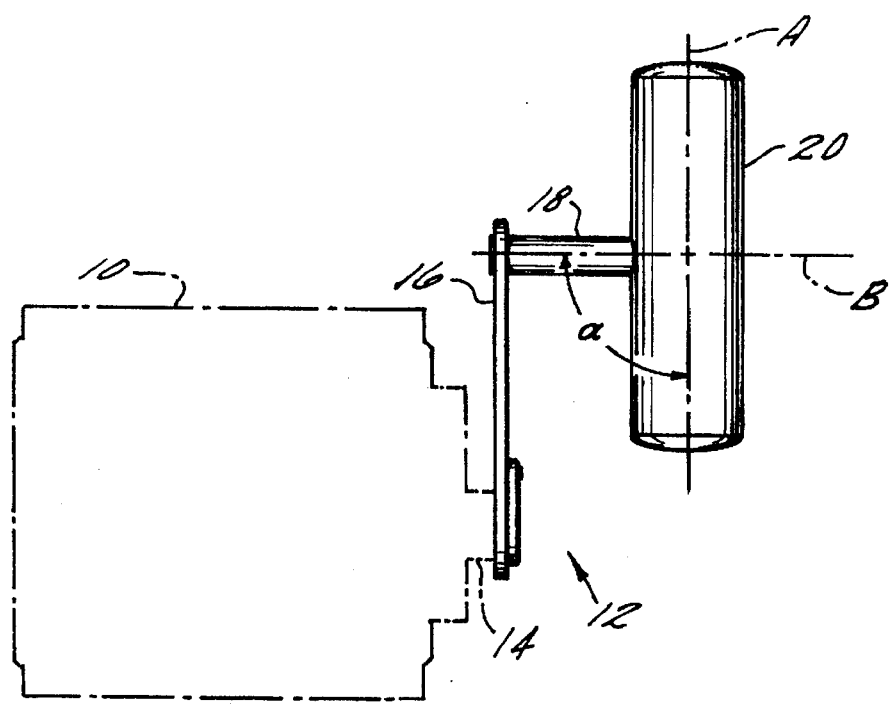
FIG. 1 is a front view of a fishing reel having a crank with a handle assembly attached to the crank in accordance with the prior art.

Referring first to prior art FIG. 1, a fishing reel 10 has a crank assembly 12 for winding the reel as is well known. Crank assembly 12 comprises a crank 14 with a member 16 connected at one end thereof for rotation with crank 14. The other end of member 16 has a rotatable shaft 18 affixed thereto with a handle 20 affixed at the other end of shaft 18. Handle 20 has a center axis A passing longitudinally therethrough and shaft 18 has a center axis B passing longitudinally therethrough. Axis A is generally perpendicular to axis B, i.e., $\alpha$ is 90°.

Figure 2:
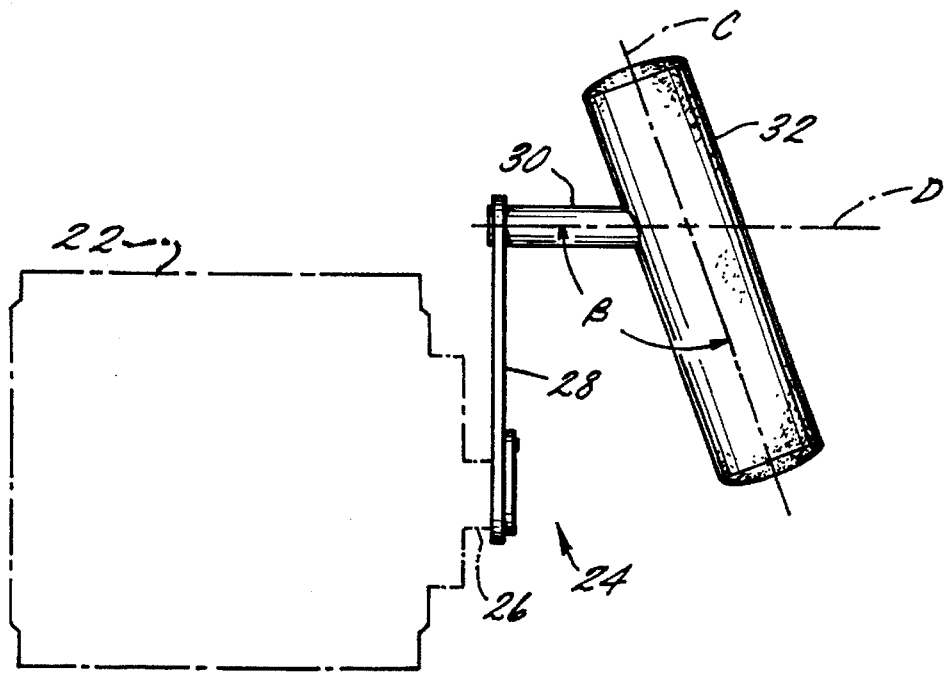
FIG. 2 is a front view of a fishing reel having a crank with a handle assembly attached to the crank in accordance with the prior art.

Referring now to FIG. 2, a known type fishing reel and handle assembly are shown. More specifically, a fishing reel 22 has a crank assembly 24 for winding the reel as is well known. Crank assembly 24 comprises a crank 26 with a member 28 connected at one end thereof for rotation with crank 26. The other end of member 28 has a rotatable shaft 30 affixed thereto with a handle 32 affixed at the other end of shaft 30. Handle 32 has a center axis C passing longitudinally therethrough and shaft 30 has a center axis D passing longitudinally therethrough. Axis C is at an angle $\beta$ of about 110° relative to axis D.

Figure 3:
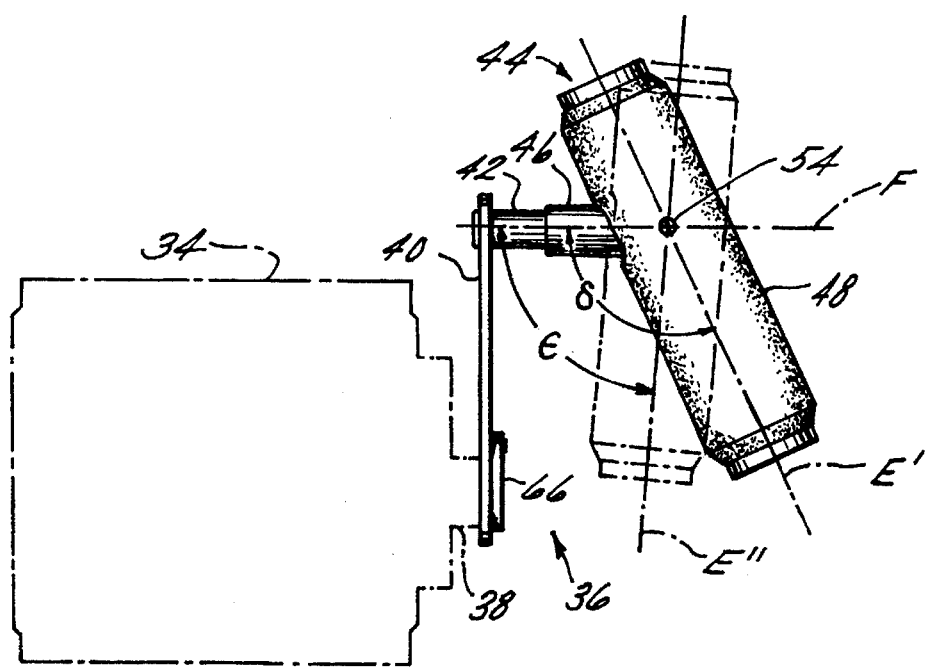
FIG. 3 is a front view of a fishing reel having a crank with a handle assembly attached to the crank in accordance with the present invention.
Figure 4:
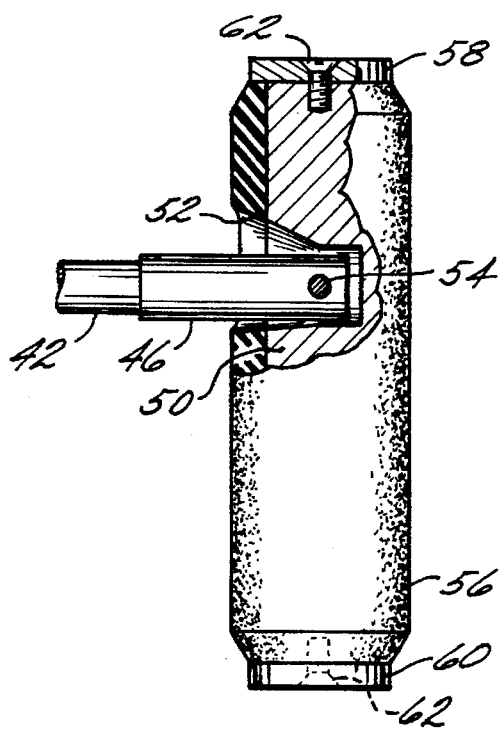
FIG. 4 is a side view of the handle of FIG. 3.
Figure 5:
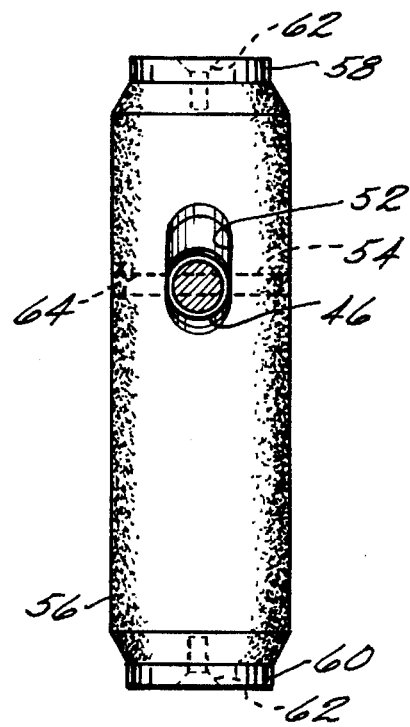
FIG. 5 is another side view of the handle of FIG. 3.

Referring to FIGS. 3–5, a reel 34 (e.g., Penn Handle Assembly) has a crank assembly 36 for winding the reel as is Well known. Crank assembly 36 comprises a crank 38 with a member 40 connected at one end thereof for rotation with crank 38. Member 40 is preferably comprised of aluminum. The other end of member 40 has a rotatable shaft 42 affixed thereto with a pivoting handle unit 44 affixed at the other end of shaft 42. Handle unit 44 includes a sleeve 46 affixed to the end of shaft 42 with a handle 48 pivotally mounted to sleeve 46. Handle 48 has a center axis E (designated E' in a first end position and E" in a second end position with handle 48 being indicated by a broken line in this second end position) passing longitudinally therethrough and shaft 46 has a center axis F passing longitudinally therethrough. Axis E' is at an angle $\delta$ of about 115° relative to axis F in the first end position. Axis E" is at an angle $\epsilon$ of about 85° or 90° relative to axis F in the second end position. Accordingly, handle 44 pivots about an axis G perpendicular (indicated by a broken line) to axes F and E, i.e., the axis which extends perpendicularly out of the drawing at the intersection of axes F and E, through about 25°–30° range between the first and second end positions. This pivoting handle is an important feature of the present invention.

Handle 48 comprises an elongated generally cylindrical member 50 with an opening 52 in the side thereof. Member 50 is preferably comprised of aluminum. Opening 52 is receptive to sleeve 46 whereby the inner surfaces of the opening define the angle of pivot for the handle relative to the sleeve. Sleeve 46 is open at one end whereby sleeve 46 fits over one end of shaft 42. Sleeve 46 is secured to shaft 42 by a suitable epoxy. Sleeve 46 and shaft 42 are preferably comprised of aluminum. The other end of sleeve 46 is preferably closed with a hole passing laterally therethrough. A retaining pin 54 passes through an opening in one side of member 50 into opening 52 where pin 54 passes through the hole in sleeve 46 and then through an opening in the opposite side of member 50, as is clearly shown in FIG. 5. Oil impregnated bronze sleeve bearings 57 may be disposed in the hole in sleeve 46 with pin 54 passing through and supported by these bearings to reduce wear. A padded cover 56 is disposed about member 50 and is secured thereon by end caps 58 and 60. Padded cover 56 is preferably comprised of a known type EVA padding. End caps 58 and 60 are secured at the ends of member 50 by recessed screws 62 in tapped holes of member 50. End caps 58 and 60 are preferably comprised of aluminum and may be anodized to provide a desired appearance. Cover 56 has an opening 64 through one side thereof where pin 54 is exposed. Cover 56 is also partially retained on member 50 by pin 54 whereby one end of pin 54 extends into cover 56. It will be appreciated that shaft 42 could extend into opening 52 and be pivotally connected to handle 48 by pin 54 in the same manner sleeve 46 was connected to handle 48, thereby eliminating sleeve 48.

Member or arm 40 has a standard shaped opening for mating with crank 38. Further, as is known, member 40 includes a tapped screw hole for receiving a screw which secures a retaining plate 66 (FIG. 3). Accordingly, in a preferred embodiment, the assembly comprising member 40, shall 43 and handle 48 is readily replaceable with the corresponding assembly on a standard feel. In other words neither the reel nor the crank require any modification to employ the assembly of the present invention.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A pivoting handle for a fishing reel, the fishing reel including a crank with an arm attached at one end thereof to the crank and a shaft attached at the other end of the arm, said pivoting handle comprising:

a sleeve having an opening at one end thereof for attachment to said shaft of the fishing reel; and a handle pivotally connected to the other end of said sleeve for pivoting in substantially a single plane about a first axis which is generally perpendicular to a second axis passing longitudinally through about the center of said sleeve.

2. The pivoting handle of claim 1 further comprising:
a pin passing through said sleeve and said handle for pivotally connecting said handle to said sleeve.

3. The pivoting handle of claim 2 further comprising:
bearings disposed in said sleeve with said pin being supported by said bearings within said sleeve.

4. The pivoting handle of claim 1 wherein said handle has a third axis passing longitudinally through about the center thereof, said handle being pivotable between a first position where an angle between said second and third axes is about 115° and a second position where the angle between said second and third axes is about 90°.

5. The pivoting handle of claim 1 further comprising:
a padded cover disposed over said handle.

6. The pivoting handle of claim 5 further comprising:
an end cap disposed at each end of said handle, said end caps securing said padded cover on said handle.

7. The pivoting handle of claim 5 wherein said padded cover is comprised of ethyl vinyl acetate padding material.

8. The pivoting handle of claim 1 wherein said handle has a third axis passing longitudinally through about the center thereof, said handle being pivotable between a first position where an angle between said second and third axes is about 115° and a second position where the angle between said second and third axes is about 85°.

9. A pivoting handle assembly for a fishing reel, the fishing reel including a crank, said pivoting handle comprising:

an arm having an opening at one end thereof for attachment to the crank;

a shaft attached at one end thereof to the other end of said arm; and a handle pivotally connected to the other end of said shaft for pivoting in substantially a single plane about a first axis which is generally perpendicular to a second axis passing longitudinally through about the center of said shaft.

10. The pivoting handle assembly of claim 9 further comprising:

a pin passing through said shaft and said handle for pivotally connecting said handle to said shall.

11. The pivoting handle assembly of claim 10 further comprising:

bearings disposed in said shaft with said pin being supported by said bearings within said shaft.

12. The pivoting handle assembly of claim 9 wherein said handle has a third axis passing longitudinally through about the center thereof, said handle being pivotable between a first position where an angle between said second and third axes is about 115° and a second position where the angle between said second and third axes is about 90°.

13. The pivoting handle assembly of claim 9 further comprising:

a padded cover disposed over said handle.

14. The pivoting handle assembly of claim 13 further comprising:

an end cap disposed at each end of said handle, said end caps for securing said padded cover on said handle.

15. The pivoting handle assembly of claim 13 wherein said padded cover is comprised of ethyl vinyl acetate padding material.

16. The pivoting handle assembly of claim 9 wherein said handle has a third axis passing longitudinally through about the center thereof, said handle being pivotable between a first position where an angle between said second and third axes is about 115° and a second position where the angle between said second and third axes is about 85°.

17. A pivoting handle for a fishing reel, the fishing reel including a crank with an arm attached at one end thereof to the crank and a shaft attached at the other end of the arm, said pivoting handle comprising:

a sleeve having an opening at one end thereof for attachment to said shaft of the fishing reel; and a handle pivotally connected to the other end of said sleeve for pivoting about a first axis which is generally perpendicular to a second axis passing longitudinally through about the center of said sleeve, said handle having a third axis passing longitudinally through about the center thereof, said handle being pivotable between a first position where an angle between said second and third axes is obtuse and a second position where said angle between said second and third axes is acute or about 90°.

18. The pivoting handle of claim 17 wherein said angle between said second and third axes in said first position is about 115°.

19. The pivoting handle of claim 17 further comprising:
a pin passing through said sleeve and said handle for pivotally connecting said handle to said sleeve.

20. The pivoting handle of claim 19 further comprising:

bearings disposed in said sleeve with said pin being supported by said bearings within said sleeve.

21. The pivoting handle of claim 17 further comprising: a padded cover disposed over said handle.

22. The pivoting handle of claim 21 further comprising: an end cap disposed at each end of said handle, said end caps for securing said padded cover on said handle.

23. The pivoting handle of claim 21 wherein said padded cover is comprised of EVA padding material.

24. A pivoting handle assembly for a fishing reel, the fishing reel including a crank, said pivoting handle comprising:

an arm having an opening at one end thereof for attachment to the crank;

a shaft attached at one end thereof to the other end of said arm; and a handle pivotally connected to the other end of said shaft for pivoting about a first axis which is generally perpendicular to a second axis passing longitudinally through about the center shaft, said handle having third axis passing longitudinally through about the center thereof, said handle being pivotable between a first position where an angle between said second and third axes is obtuse and a second position where said angle between said second and third axes is acute or about 90°.

25. The pivoting handle of claim 24 wherein said angle between said second and third axes in said first position is about 115°.

26. The pivoting handle assembly of claim 24 further comprising:

a pin passing through said shaft and said handle for pivotally connecting said handle to said shaft.

27. The pivoting handle assembly of claim 26 further comprising:

bearings disposed in said shaft with said pin being supported by said bearings within said shaft.

28. The pivoting handle assembly of claim 24 further comprising:

a padded cover disposed over said handle.

29. The pivoting handle assembly of claim 28 further comprising:

an end cap disposed at each end of said handle, said end caps for securing said padded cover on said handle.

30. The pivoting handle assembly of claim 28 wherein said padded cover is comprised of EVA padding material.

* * * * *